(12) United States Patent
Caristan

(10) Patent No.: US 8,492,677 B2
(45) Date of Patent: Jul. 23, 2013

(54) PROCESS FOR LASER CUTTING A METAL PLATE

(75) Inventor: Charles L. Caristan, Houston, TX (US)

(73) Assignee: Air Liquide Industrial U.S. L.P., Houston, TX (US)

(*) Notice: Subject to any disclaimer, the term of this patent is extended or adjusted under 35 U.S.C. 154(b) by 839 days.

(21) Appl. No.: 12/619,860

(22) Filed: Nov. 17, 2009

(65) Prior Publication Data

US 2010/0122971 A1 May 20, 2010

Related U.S. Application Data

(60) Provisional application No. 61/116,129, filed on Nov. 19, 2008.

(51) Int. Cl.
*B23K 26/00* (2006.01)

(52) U.S. Cl.
USPC .................................................. 219/121.72

(58) Field of Classification Search
USPC ............................. 219/120–130; 83/868, 865
IPC ............ B23K 26/38,26/08, 26/10, 26/20, 26/30
See application file for complete search history.

(56) References Cited

U.S. PATENT DOCUMENTS

| | | | | |
|---|---|---|---|---|
| 4,796,341 A * | 1/1989 | Kuhn, II | .......................... | 29/33 P |
| 5,139,245 A | 8/1992 | Bruns et al. | | |
| 5,341,717 A | 8/1994 | Feldman | | |
| 5,758,869 A | 6/1998 | Redeker | | |
| 6,310,317 B1 | 10/2001 | Remue | | |
| 6,563,081 B2 | 5/2003 | Pace | | |
| 6,666,063 B2 | 12/2003 | Pick et al. | | |
| 6,710,291 B1 * | 3/2004 | Wegener et al. | ......... | 219/121.72 |
| 2009/0212033 A1 | 8/2009 | Beck et al. | | |

FOREIGN PATENT DOCUMENTS

| | | |
|---|---|---|
| DE | 10019368 | 10/2001 |
| DE | 20319159 | 3/2004 |
| EP | 0248715 | 12/1987 |
| EP | 0461064 | 12/1991 |
| EP | 1002595 | 5/2000 |
| EP | 1238746 | 9/2002 |

OTHER PUBLICATIONS

Charles L Caristan (2003), "Laser Cutting Guide for Manufacturing", Society of Manufacturing Engineers, SME Book Publishing, pp. 7-73.*
Search Report for PCT/EP2009/064803.

(Continued)

*Primary Examiner* — Jarrett Stark
*Assistant Examiner* — Lawrence Tynes, Jr.

(57) ABSTRACT

The present invention provides a process for laser cutting a metal plate that comprises a) providing at least a laser cutting device, b) providing a metal plate to be cut from a metal coil, c) providing at least a holding apparatus holding and maintaining the metal plate, d) cutting said metal plate by means of at least a laser beam delivered by said at least one laser cutting device In this process, during step d), the metal plate is first cut by a first line comprising at least a first cutting machine, into at least one peripheral blank, and at least one peripheral blank is subsequently fed to at least a second line comprising at least a second cutting machine, to be cut into several smaller individual final blanks. With regard to this process, the first line produces peripheral blanks faster than at least one second cutting machine of the second line can cut them into several smaller individual final blanks. During laser cutting in the second line, said peripheral blank is held and maintained in position by said at least one holding apparatus.

33 Claims, 9 Drawing Sheets

OTHER PUBLICATIONS

Search Report for PCT/EP2009/064815.

Caristan, Charles; Altan, Taylan; Kaya, Serhat, "Design for Laserfacturing" IABC 2007.

Finn, Jay; Caristan, Charles, "Lightening up the Infrastructure of Blanking—Today's Viability of Continuous Coil Fed Laser Blanking", LaserCoil Brochure, Napoleon, Ohio, Jun. 2009.

Caristan, Charles; Mohiuddin, Gulam; Forrest, Mariana; Uddin, Nasim, "Product Design Guidelines for Manufacturing with Industrial Lasers", IABC 2006 International Automotive Body Congress, www.bodycongress.org., pp. 24-29.

"New Cost Advantages for Laser Blanking for Automotive Applications", WELTRAX, www.laserglobalservices.com, Mar. 29, 2006.

Caristan, Charles; Bridge, Charlie; Maynard, Steve, "Fiber Laser Cutting & Welding at Extreme Power—Extreme Speed", ALAC 2008 Conference, Minneapolis, MN, Sep. 2008.

Caristan, Charles; Finn, Jay, "Fiber Laser Blanking of Coil Strips at Extreme Speed-Extreme Power", International Conference on Applications of Lasers and Electro-Optics (ICALEO), Orlando, FL, Nov. 2009.

Stevens, Mark W., "Automotive Laser Applications" Automotive Laser Application Workshop, Detroit MI, Mar. 15, 2000.

Norlung, Olof, "Technical and Economical Optimisation of High Speed Laser Blanking in High Variant Electrical Machine Production" Lulea Tekniska University, http://epubl.luth.se/1402-1617/2001/169/, May 25, 2001.

Penn, Wayne et al., "Precision Cutting and Welding with Fiber Laser", Advanced Laser Applications Conference, 2004.

\* cited by examiner

PROCESS FOR LASER CUTTING A METAL PLATE

CROSS-REFERENCE TO RELATED APPLICATIONS

This application claims the benefit of U.S. Provisional Application No. 61/116,129, filed Nov. 19, 2008, the entire contents of which are incorporated herein by reference.

FIELD OF THE INVENTION

The present invention relates to a process for laser cutting a metal plate in which the metal plate is first cut by a first line comprising at least one first cutting machine into at least one peripheral blank and the at least one peripheral blank is subsequently fed to at least a second line comprising at least one second cutting machine to be cut into at least one individual final smaller blank piece.

BACKGROUND OF THE INVENTION

Today sheet metal blanking in production is still processed with mechanical means such as either shears or presses and blanking dies. These mechanical methods result in large engineering scrap quantities and/or large capital expenditures in dedicated blanking dies tooling costs as well as in storage, transportation, maintenance and repair costs for these tools. These mechanical methods are more profitable when the number of varieties of parts to be cut is small, thus resulting in fewer tool change set-up downtimes. However, in today's market where for example the number of models of vehicles is constantly increasing, the corresponding increase in number of dedicated tools makes mechanical processes more expensive and less adaptable to lean and flexible manufacturing.

Hence, there is a need for a laser cutting process that would enable the cutting of blanks without requiring expensive dedicated or part specific tooling and that would lead to improved productivity and/or an optimized production of blanks. Preferably, such a laser cutting process would be as flexible as possible, i.e., part changes could be mainly carried out by changing a CNC software part program.

SUMMARY OF THE INVENTION

One embodiment of the present invention provides a process for laser cutting a metal blank comprising the steps of: a) providing at least one laser cutting device, b) providing a metal plate to be cut from a metal coil, c) providing at least a holding apparatus for holding and maintaining the metal plate, d) cutting the metal plate by means of at least a laser beam delivered by the at least one laser cutting device, wherein in step d): i) the metal plate is first cut by a first line comprising at least a first cutting machine having at least one laser cutting device, into at least one peripheral blank, and ii) the at least one peripheral blank is subsequently fed to at least a second line comprising at least a second cutting machine having at least one laser cutting device, to be cut into several smaller individual final blanks, while said peripheral blank is held and maintained in position by the at least one holding apparatus; and wherein the first line produces peripheral blanks faster than the at least one second cutting machine of the second line can cut them into several smaller individual final blank pieces.

DETAILED DESCRIPTION OF THE INVENTION

The present invention provides a process for laser cutting, more particularly for laser cutting a metal plate (also referred to herein as a "workpiece"). In this process, the first phase involves providing at least one laser cutting device, providing a metal plate to be cut from a metal coil, and then cutting a peripheral contour metal plate (peripheral blank) by means of at least a laser beam delivered by the at least one laser cutting device. The second phase involves feeding this peripheral contour metal plate into at least one additional laser cutting machine, providing at least one holding apparatus for holding and maintaining the peripheral contour metal plate, the holding apparatus having at least one bridge rail module comprising a table frame and at least one holding device module, laser cutting the peripheral contour metal plate while it is held and maintained in position by the at least one holding apparatus. With regard to the present invention, in order to yield equivalent throughput as mechanical cutting means, several laser cutting machines can be used in series or parallel configurations. The present invention describes a modular configuration with two stations and the means to enable the invention with minimum risk and maximum redundancy.

Figure 1:
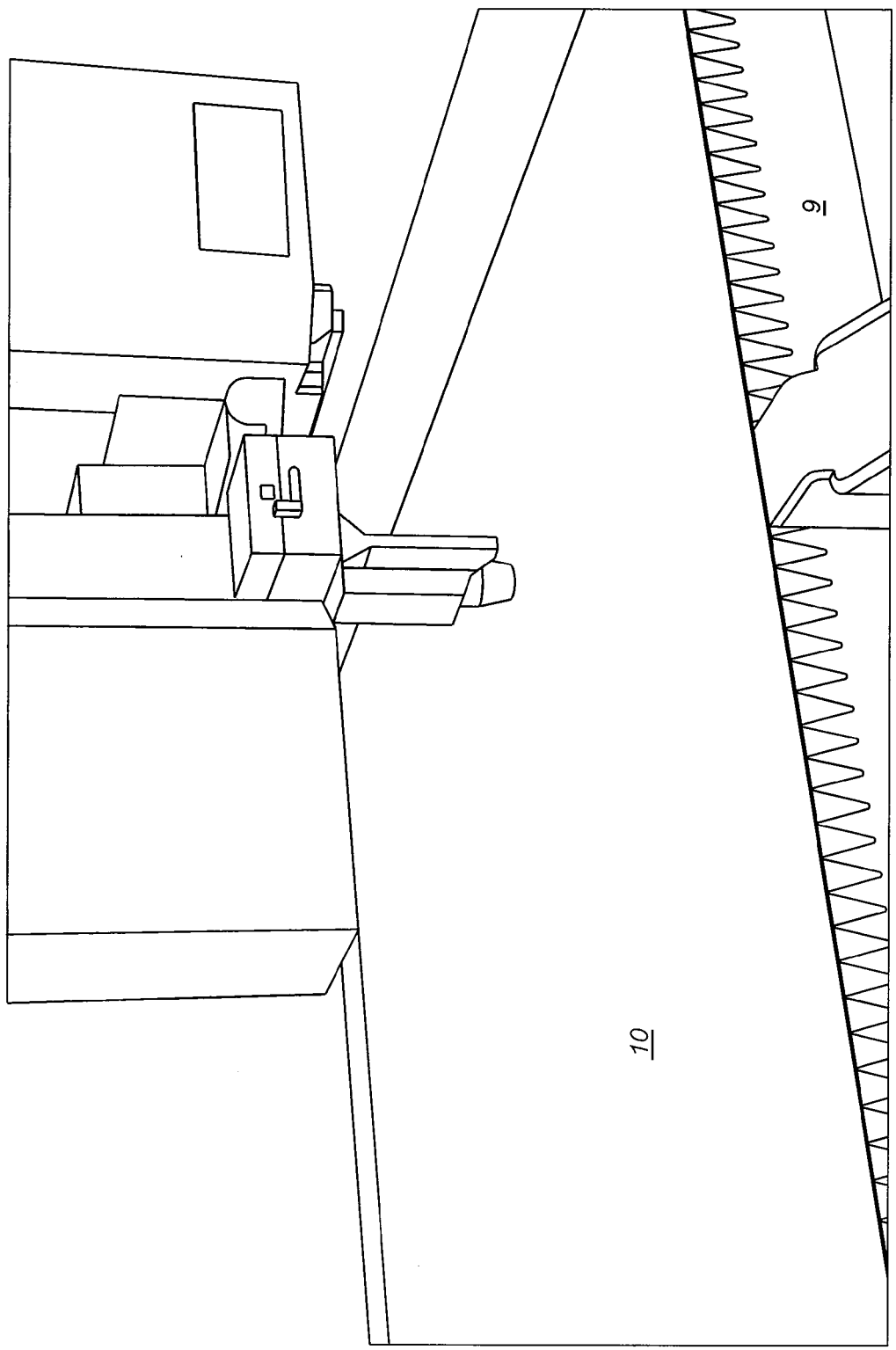
FIG. 1 illustrates a traditional grid table for laser cutting operations.
Figure 2:
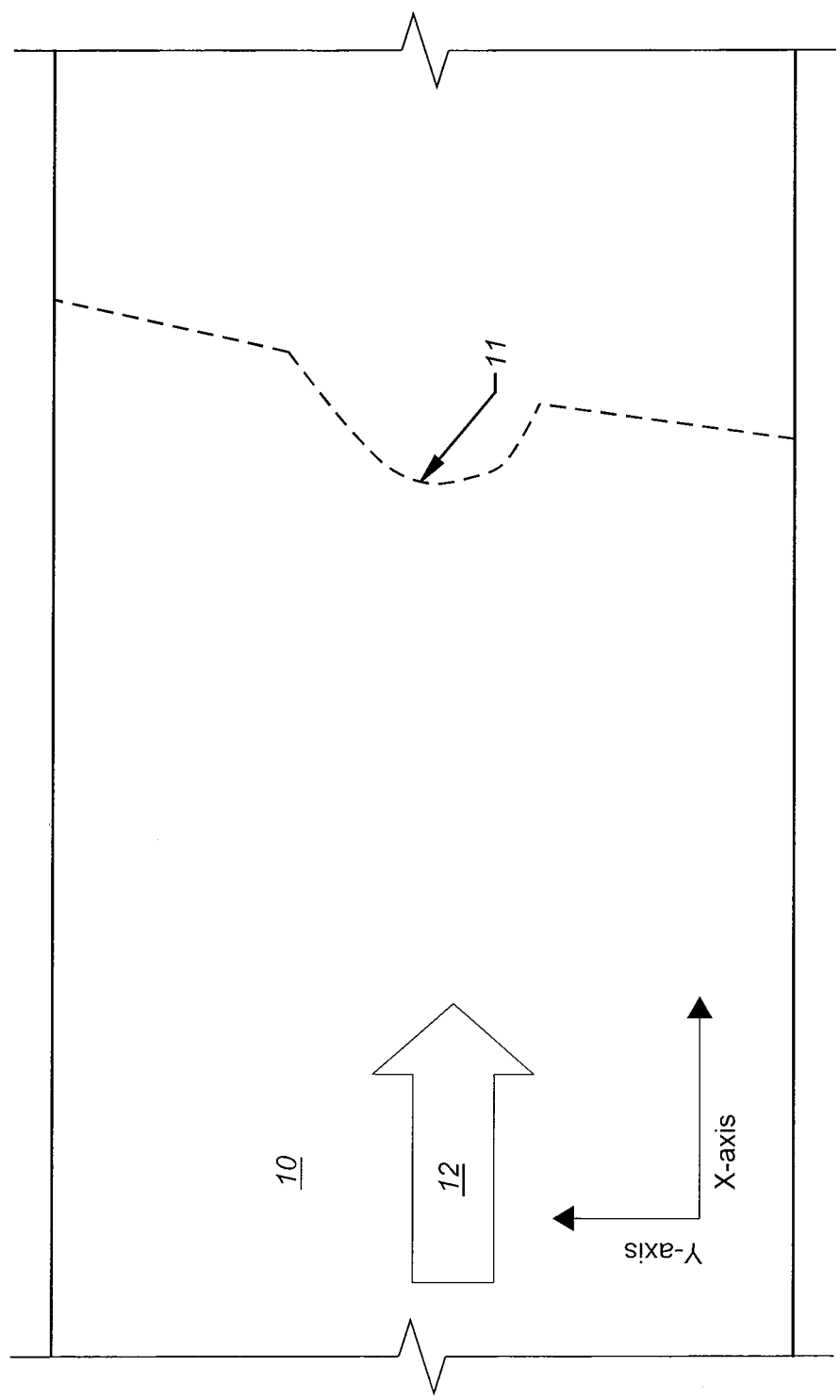
FIG. 2 illustrates an example of a continuous coil feed presenting a workpiece progression above the engineered table.

FIG. 1 shows a traditional grid table for laser cutting operations. The grids 9 of toothed bridges for blank supports, sitting across the grid table, are consumable structures and act only as bottom supports for blank parts. These types of grids hold the material down and in place due to the weight of the material and the frictional force on the toothed bridge during the cutting of the flat metal 10 along the cutting line 11, as represented in FIG. 2. This can lead to cutting and/or quality issues when, for instance, the material's surface moves during the actual cutting due to residual stress, or mechanical stress and/or thermal stress induced in the material during cutting. Furthermore, the teeth of the support grid structure are some-times on the cutting path of the laser beam which can at times yield cutting quality defects such as burr, dross, loss of cut, gouging, etc.

Figure 3:
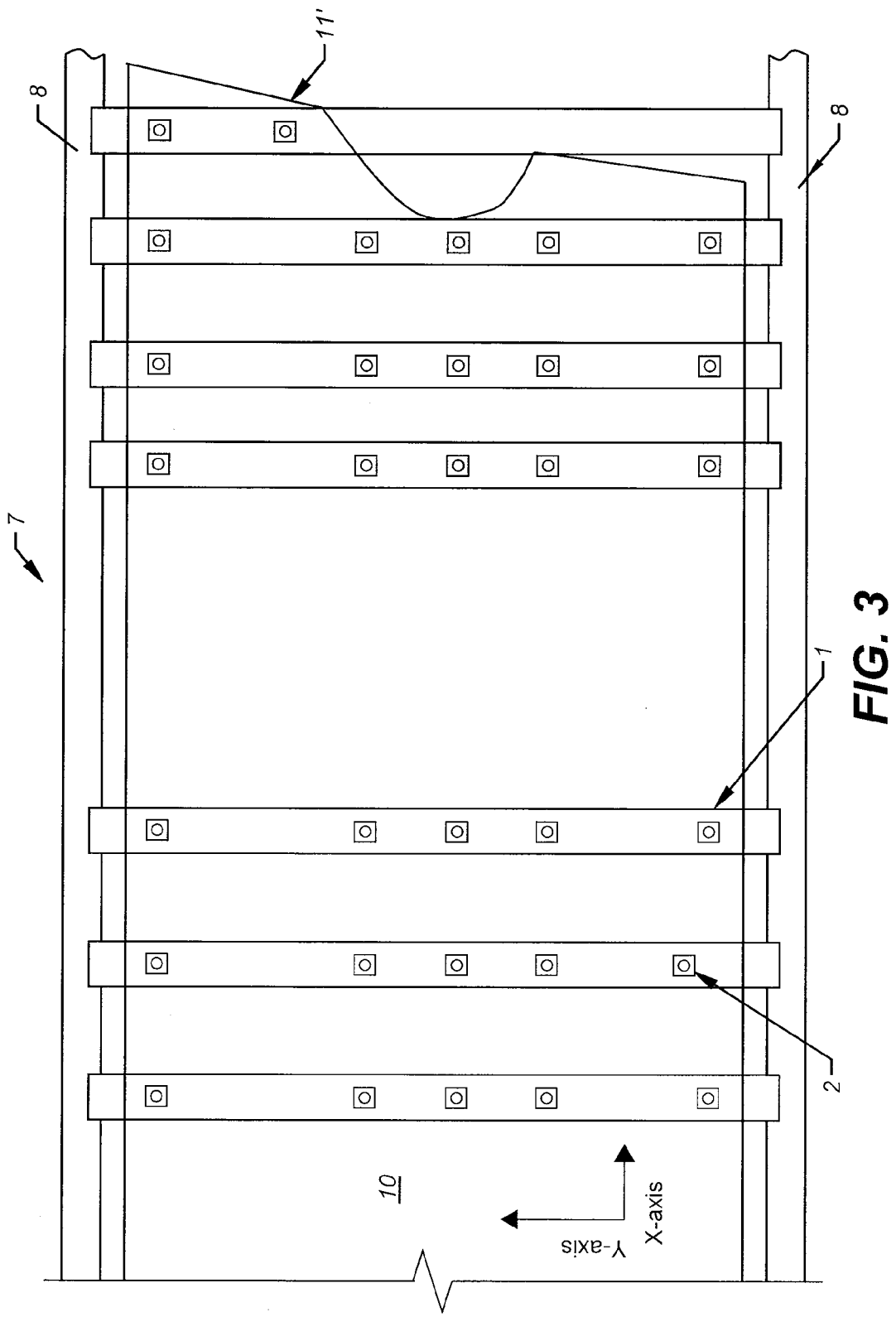
FIG. 3 illustrates an example of a continuous coil feed presenting a workpiece progression above the engineered holding apparatus according to one embodiment of the present invention.
Figure 4:
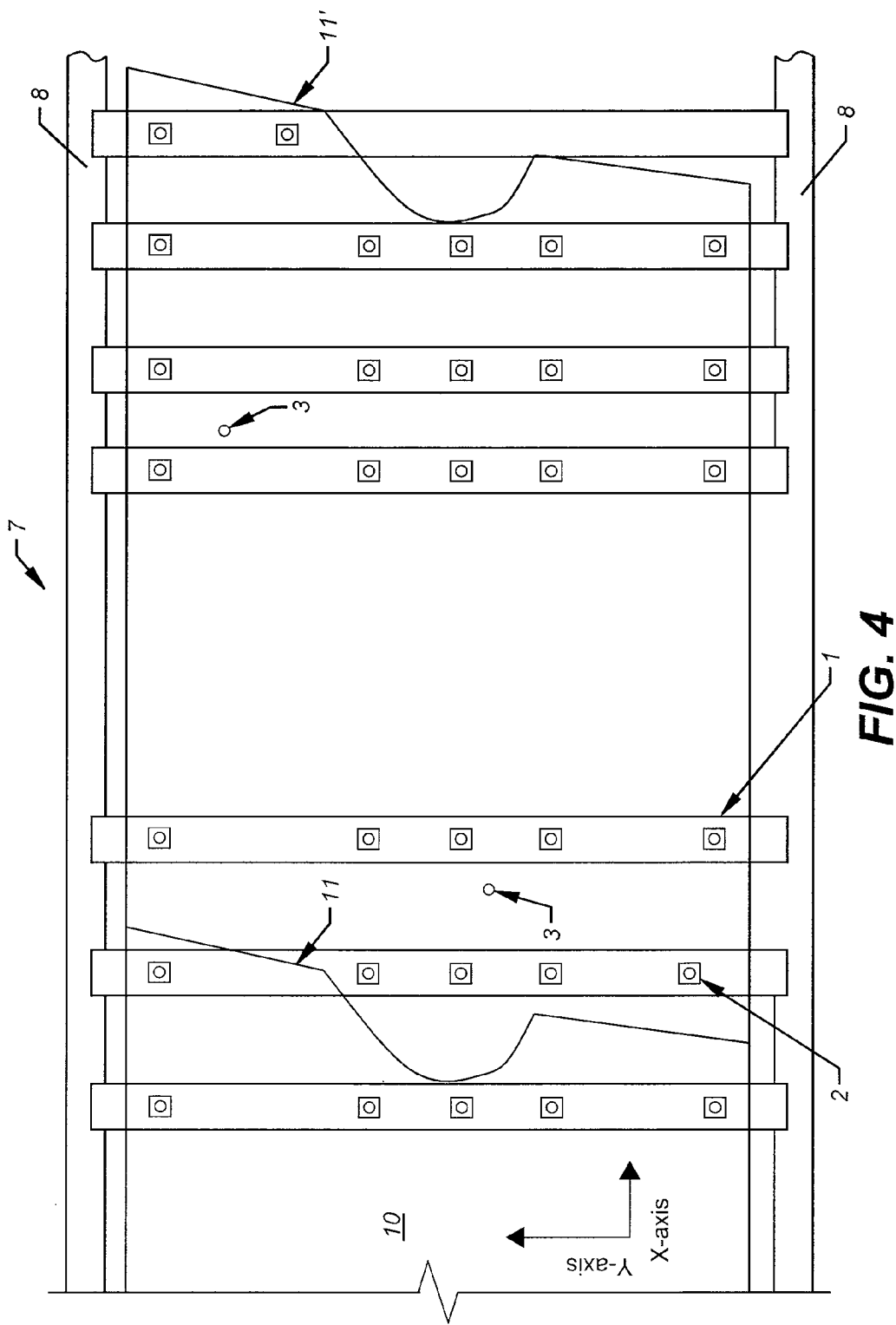
FIG. 4 illustrates an example of a continuous coil feed presenting a workpiece progression above the engineered holding apparatus according to an additional embodiment of the present invention.

For these reasons, it is preferred to use the engineered holding apparatus 7 as shown in FIGS. 3 and 4 for holding the pieces to be cut more forcefully when carrying out the process according to the present invention compared to the prior art processes when only weight and friction force were used to hold the pieces to be cut. More precisely, FIGS. 3 and 4 represent a top view of a metal plate 10, i.e. a metal coil, disposed on an engineered holding apparatus 7 to be used as the holding apparatus in an embodiment of the process of the present invention. The engineered holding apparatus 7 shown in FIGS. 3 and 4 comprises a table frame 8, seven bridge rail modules 1, each bridge rail module 1 comprising from two to five holding device modules 2, for a total of thirty two holding device modules 2. The holding device modules 2 are selected from suction cups, magnetic cups, electromagnetic cups or any combination thereof. Those of ordinary skill in the art will recognize that the number of bridge rail modules 1 can be greater than or lower than seven and the total number of holding device modules 2 on the holding apparatus 7 can be greater than or lower than thirty two. Preferably, the holding apparatus 7 comprises from 1 to 20 bridge rail modules 1 and from 1 to 20 holding device modules 2. The bridge rail modules 1 are preferably parallel to one another, but each can also be designed with different orientations to one another, with respect to the Y axis direction. These bridge rail modules 1 are fixed in position on the engineered holding apparatus 7 before the workpiece 10 to be cut is brought on to the engineered holding apparatus 7. Once the workpiece 10 is in a stationary position, the holding device modules 2 are activated to provide sufficient suction and/or magnetic force to hold down the material in place during cutting.

FIGS. 2, 3 and 4 each illustrate an example of a continuous coil feed presenting a workpiece 10 progression above the engineered holding apparatus 7. The workpiece 10 can be laser cut while in progression above the engineered holding apparatus 7 or preferably it is stopped periodically at the end of each progression or at the end of each feed. In FIG. 3, the bridge rail modules 1 of the engineered holding apparatus 7 are shown in position immediately before the start of a new cut, whereas FIG. 4 shows the bridge rail modules 1 of the engineered holding apparatus 7 in position immediately after the end of a new cut line 11 and cut reference locator features 3 which function as positioning holes. To enable such workpiece 10 feed and stop periodic motion, a coil retardation loop can be put in place similar to that which is common in continuous coil die blanking operations. For systems where the workpiece 10 is being laser cut while in progression above the engineered holding apparatus 7, no retardation loop for feed and stop is necessary and the coil is fed continuously. As further shown in FIG. 4, at least one laser cut has been made in the flat metal plate 10 (coil) between the bridge rail modules 1. FIG. 4 also illustrates that two reference locator features 3 have been also cut in the form of holes through the metal plate 10 forming the blank.

Figure 5:
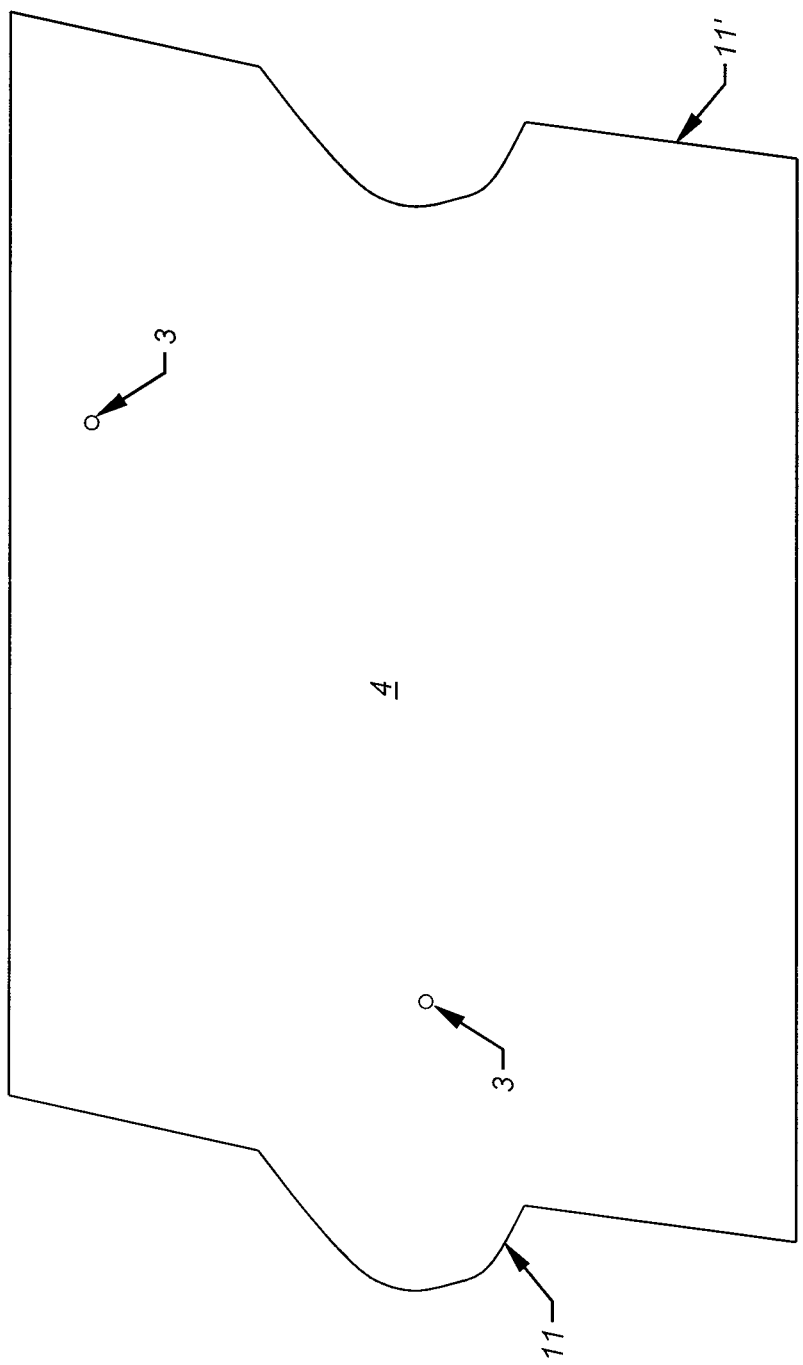
FIG. 5 illustrates the peripheral blank detached from the coil-feed station before it is further cut into a multitude of smaller blank pieces.

FIG. 5 shows the peripheral blank 4 obtained after the laser cutting operation of FIG. 4. This peripheral blank 4 has been laser cut at its ends along desired cutting lines (11, 11'). Lines 11 and 11' have been obtained during two successive cuts, respectively, as illustrated in FIGS. 3 and 4 and explained hereinbefore. The peripheral blank 4 further comprises the two reference locator features 3. Those of ordinary skill in the art will recognize that the number of reference locator features 3 can differ from the example given—2—and their contour can differ in shape from holes.

Instead of a traditional grid 9 of consumable toothed bar bridge, it is preferred, in one embodiment of the process of the present invention, to have a heavy duty universal flexible engineered holding apparatus 7 that not only provides the minimum material support necessary for a laser-cutting machine (even if not optionally equipped with a height sensor closed-loop profiling) but also means for holding the material in place during cutting. The frame 8 of the engineered holding apparatus 7 should be of a heavy duty construction. More specifically, the frame 8 will typically be made of a fabricated metal structure and/or a steel cast. It should have X-axis guides along at least one X-axis side. In addition, it should be able to sustain direct or reflected laser irradiation without suffering from excessive heat distortion. If it is so wished, the bridge rail modules 1 can be oriented parallel to or within an orientation angle from either the X axis or the Y axis direction. In addition, these bridge rail modules 1 do not have to be parallel to one another, nor in the shape of straight segments.

Such an engineered holding apparatus 7 can comprise many needed bridge rail modules 1 running across its Y-axis (parallel to the Y-axis or otherwise). These adjustable bridge rail modules 1 are slidable or movable along the X-axis rails of the frame 8 to allow for positioning anywhere along the X-axis and Y-axis of the frame 8. Each bridge rail module 1 can be removed from the holding apparatus 7 for cleaning and/or maintenance and set-up. These bridge rail modules 1 are also heavy duty rigid structures that should be designed as narrow as possible so that detached scrap parts could possibly fall through and be collected by a scrap conveyor underneath the holding apparatus 7. As with the frame 8 of the holding apparatus 7, the bridge rail modules 1 will typically be constructed of fabricated metal structure or a cast. If necessary, the part program may add additional cut sequences to cut the engineering scrap into smaller pieces that can easily fall through the grid of bridge rail modules 1 for evacuation and collection. These bridge rail modules 1 may also include channels for an optional water cooling system (not shown). Optionally, engineered scrap pieces that do not fall through the grid 9 of bridge rail modules 1 can be evacuated and collected through different pre-engineered means.

Each of the bridge rail modules 1 includes heavy duty holding device modules 2 and location modules 5 that are adjustable along the bridge rail modules 1. As many holding device modules 2 and location modules 5 as needed can be used, as along as they can spatially fit in a given bridge rail module 1. The location modules 5 are preferably pins.

The engineered frame 8, bridge rail modules 1 and holding device modules 2 of the table holding apparatus 7 have adequate machined surfaces that can be flat or not in order to provide local part support and also have suction or magnetic force which provides the equivalent of clamping tension to hold the material in place, i.e., the metal plate 10 to be cut, including providing tension in spaces between holding device modules 2. The support surfaces of these holding device modules 2 also serve as the reference height surface for the peripheral blanks 4 that rest on them. The support surfaces can be elevated with respect to the surface of the bridge rail module 1, or alternatively could be designed to be flush even with it.

Figure 6:
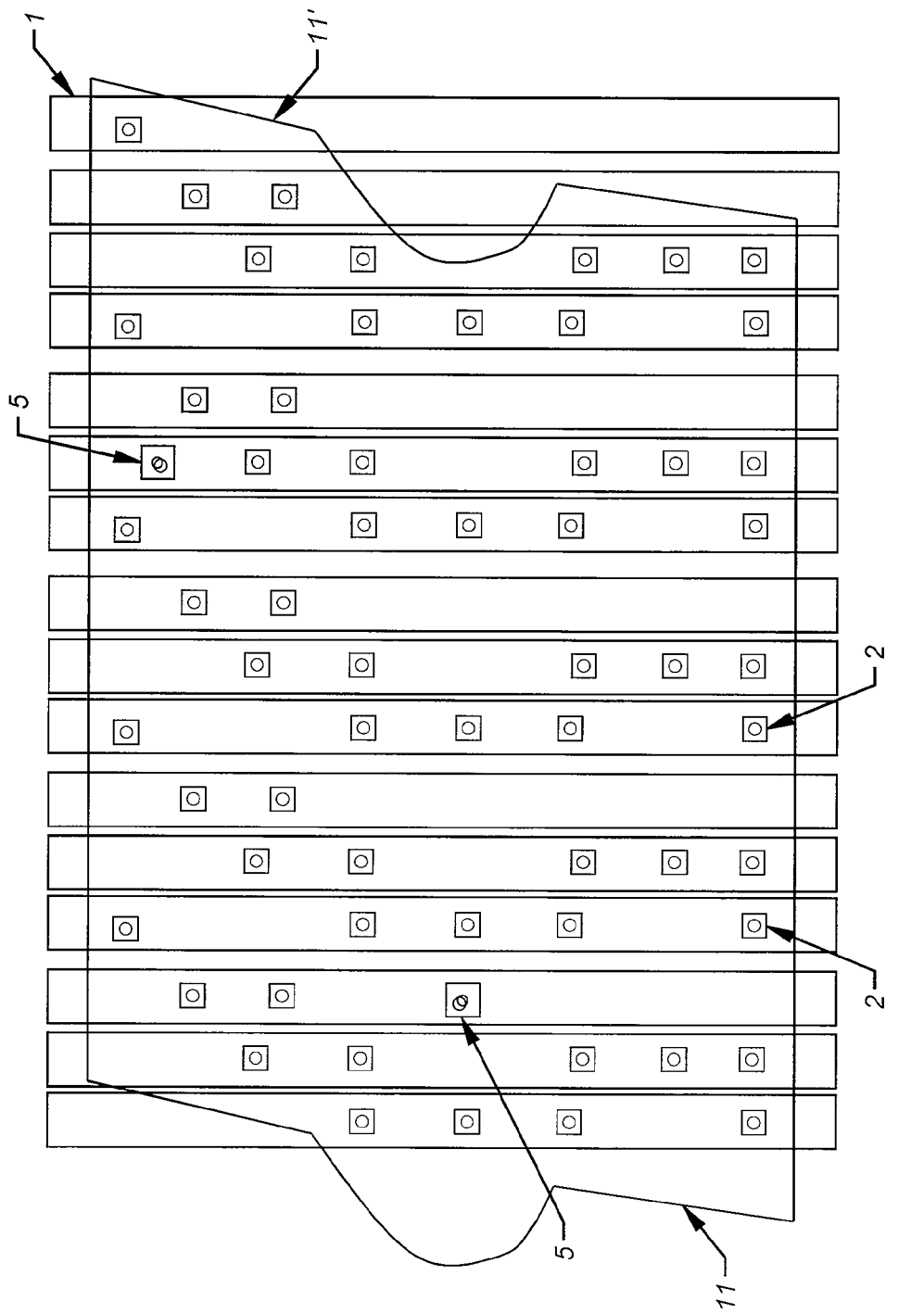
FIG. 6 illustrates an alternative embodiment of the peripheral blank detached from the coil-feed station before it is further cut into a multitude of smaller blank pieces.
Figure 7:
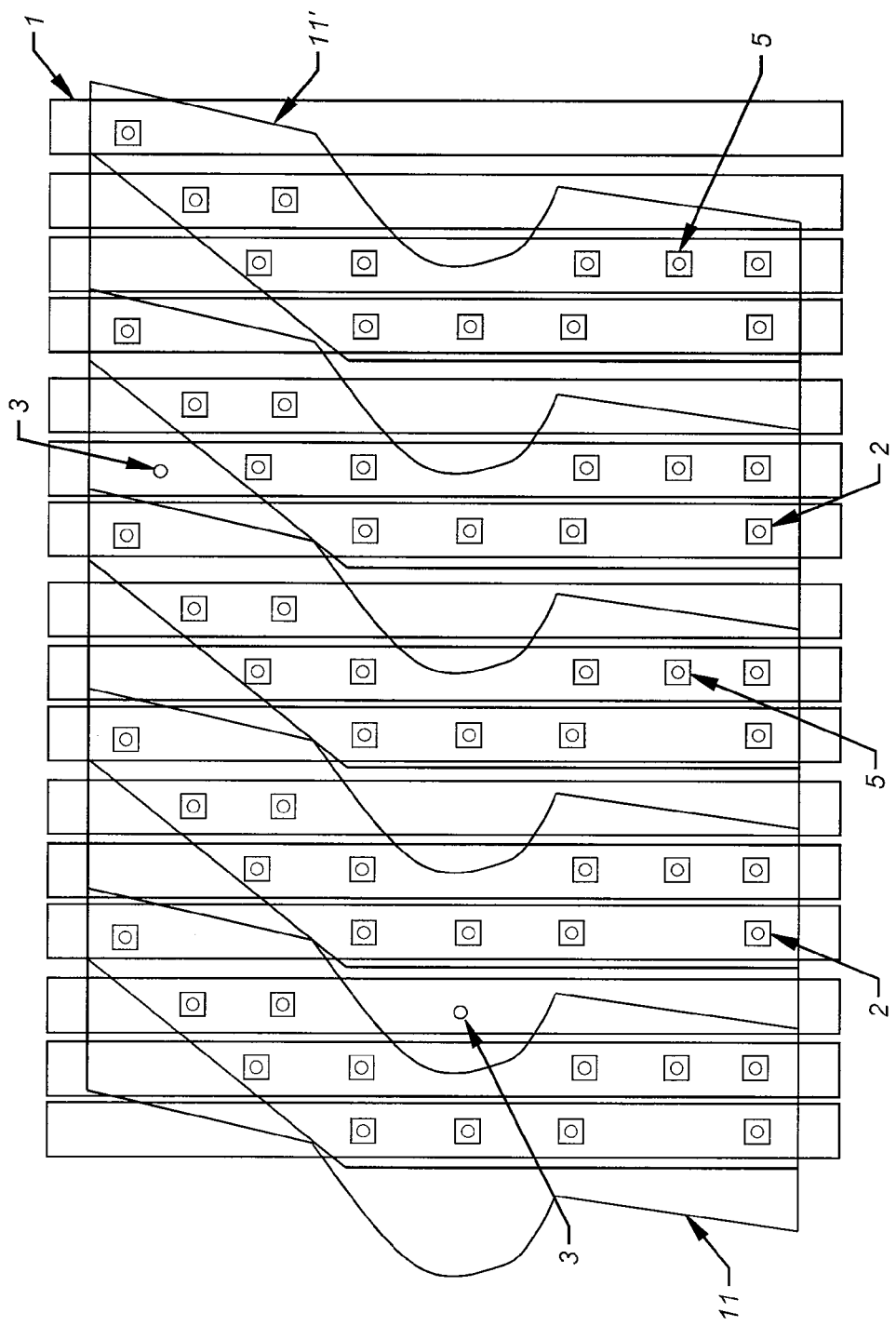
FIG. 7 illustrates five of these smaller blank pieces after they have been cut.

FIGS. 6 and 7 show another embodiment of a holding apparatus usable for carrying out a process according to the present invention, wherein some of the bridge rail modules 1 comprise location modules 5 that are used for detecting/locating the reference locator features 3 that have been pierced through the metal plate 10 forming the peripheral blank 4 as explained above. FIGS. 5 and 6 show the peripheral blank 4 detached from the coil feed station and before it is further cut into a multitude of smaller blank pieces 6, whereas FIG. 7 shows five of these smaller blank pieces 6 after they have been cut in peripheral blank 4.

The holding device modules 2 and location modules 5 positioned on the bridge rail modules 1 are located strategically as a function of the nesting and of the part program path of the laser head. The path 12 of the cutting focusing head should preferably never go across a holding device module 2 when the laser beam is on; however it can go across a bridge rail module 1. This eliminates the parts from tipping over without falling and also the parts from sticking out as a collision object on the path of the cutting head. It also avoids material moving from its position induced by heat input thermal displacements or residual stress spring back which could lead to parts being cut out of dimensional accuracy tolerances.

These holding device modules 2 and locator modules 5 should preferably be easy to change for the purposes of cleaning, maintenance or repair purposes. The whole holding apparatus 7 is rigid and can be leveled at installation so that all of the holding device modules 2 surfaces are at the same reference height surface on which the workpiece rests during cutting. Small height changes are acceptable on the work envelope as long as they do not scratch the workpiece, nor permanently deform it, and as long as the slope of height difference does not exceed a threshold beyond which cutting performance variations become out of control across the work envelope.

Figure 8B:
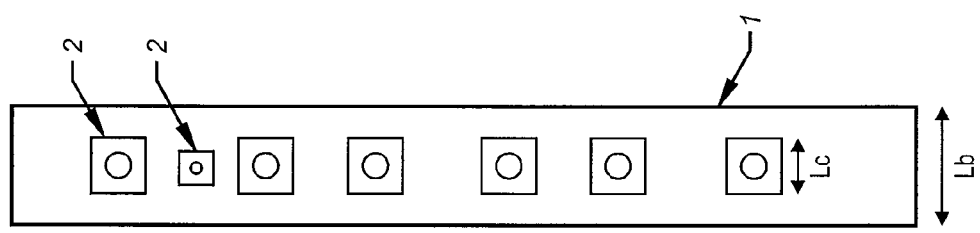
FIG. 8B illustrates that each bridge rail module must be rigid as it will serve as a reference height surface.
Figure 8A:
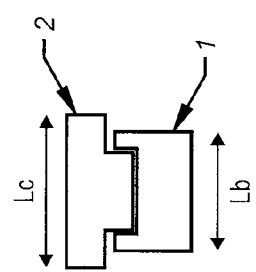
FIG. 8A illustrates that reference surfaces of the holding device modules are machined to present a leveled reference surface of the holding device modules upon which the workpiece rests under the hold down.

As illustrated in FIG. 8A, all elements of the holding device modules are machined to present a leveled reference surface of the holding device modules 2 upon which the workpiece rests under the suction or magnetic hold down. These elements can be circular, square or any appropriate and adequate shape and have a width Lc. In the case where the holding device modules 2 are suction cups, quick disconnects for compressed gas or air and vacuum feed and return lines are an option. Thus the holding device modules 2 are in fluid connection with at least a vacuum source, such as a vacuum pump, a Venturi type suction device or any other vacuum device able to create an under-pressure, i.e. a pressure less than the pressure of the surrounding atmosphere (<1 atm), and to thus obtain a holding by suction effect in the holding device modules 2 allowing a firm holding of the piece to be cut.

As illustrated in FIG. 8B, each bridge rail module 1 must be rigid as it will serve as a reference height surface. The bridge rail module 1 must also be heavy duty and easy to clean for purposes of maintenance. The width Lc of the holding device modules module 2 reference surface can be either smaller than or larger than the width (or diameter if cylindrical) Lb of the bridge rail module. On an engineered holding apparatus 7, holding device modules s 2 can have different sizes and shapes but should be set up such that all present adequate reference surface position(s) upon which the peripheral blank 4 rests. While, in most cases, the engineered holding apparatus 7 presents the workpiece 10 in a horizontal position, during cutting, alternatively, the present invention includes set ups in which the engineered holding apparatus 7 can present the workpiece 10 surface in a non-horizontal position or even a vertical position during laser cutting.

Figure 9:
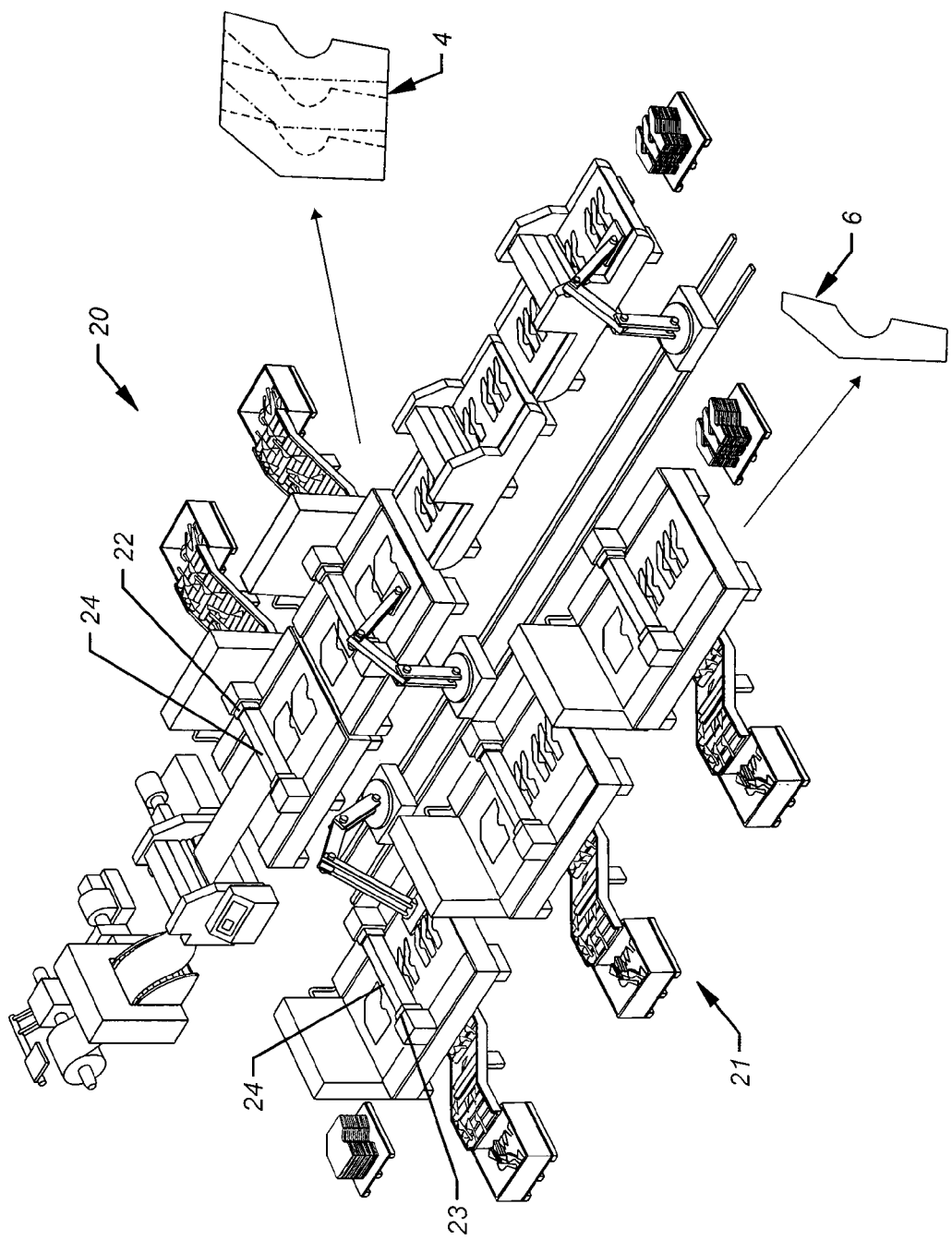
FIG. 9 illustrates an embodiment of a high speed laser blanking installation that can be equipped with the holding apparatus for carrying out the process of the present invention.

FIG. 9 represents an embodiment of a high speed laser blanking installation that can be equipped with the holding apparatus 9 for carrying out the process of the present invention. As one can see, the installation comprises several lines 20, 21 among which is a first line or coil-fed station 20 for cutting and detaching the peripheral blanks 4, and a second line or blank-fed station 21 for cutting and detaching the final individual parts or smaller blank pieces 6 obtained from further cutting of the peripheral blanks 4 obtained with the first line 20.

The metal plate (coil) 10 is first cut by a first cutting machine 22 of a production first line 20, into peripheral blanks 4 and then the peripheral blanks 4 are subsequently fed to one or several second cutting machines 23 of at least a production second line 21, to be cut into several smaller individual final smaller blank pieces 6. Preferably, several second cutting machines 23 are used and work in parallel. The cutting machines 22, 23 that are utilized are laser cutting machines, such as for example fiber laser cutting machines, $CO_2$ laser cutting machines, disk laser cutting machines fiber and YAG laser cutting machines, each including at least one laser cutting device 24. In one preferred embodiment, the at least one laser cutting machine 22, 23 of the first line 20 and/or the second line 21 is equipped with a fiber laser. In an alternative embodiment of the present invention, the laser of the at least one laser cutting machine 22, 23 of the first line 20 and/or the second line 21 has an output power of at least 2 kW, preferably of at least 5 kW.

According to the process of the present invention, the first line 20 (i.e., the coil-fed station), produces peripheral blanks 4 faster than at least one cutting machine 23 of the second line 21 (i.e. the blank-fed station). Indeed, each laser machine 22 of the coil-fed station 20 generally has a cycle time per final part shorter than even press die-blanking. Therefore, for a line balancing cycle time point of view, one does not need two laser machines 22 at the coil-fed station 20. However, the inclusion of two laser machines 22 would allow redundancy during downtime for set-up, maintenance and repair of the laser machines. Nevertheless, it is recommended to use at least two laser machines 23 at the blank-fed station 21.

In other words, the workpiece 10 is fed from a metal coil to be first cut by a first line 20 composed of at least one laser cutting machine 22 into at least one peripheral blank 4 and subsequently the peripheral blank 4 is fed to a second line 21 composed of at least another laser cutting machine 23 to be cut into several individual final smaller blank pieces 6, with the proviso that the cutting and production speed of the first line 20 producing the peripheral blanks 4 is much greater than the cutting and production speed of any machine 23 of the second line 20 producing the final individual smaller blank pieces 6, preferably at least two times greater, and more preferably from 3 to 12 times greater. For instance, the laser machine 22 from the first line 20 producing can produce a peripheral blank 4 in 4 seconds, whereas the peripheral blank 4 thus obtained is further cut into several final blank pieces 6 in at least 8 seconds by any laser cutting machine 23 of the second line 21. For this reason, the number of laser cutting machines 23 of the second line 20 is greater and proportional to the number of cutting machines 22 of the first line 20. As a further example, if the first line 20 is equipped with only one laser cutting machine 22 thereby producing a peripheral blank 4 in 5 seconds and if any laser cutting machine 23 of the second line 21 needs fifteen seconds for further cutting peripheral blanks 4, then for improving or optimizing productivity, it is advocated to use at least two and ideally three laser cutting machines 23 in the second line 21 needs that work in parallel so as to obtain either a continuous working process or at least a process with a minimum of peripheral blank stacking.

With regard to the present invention, the first line 20 produces peripheral blanks 4 faster than one laser cutting machine 23 of the second line 21 can cut them into several individual final smaller blank pieces 6. Preferably, the first line 20 produces peripheral blanks 4 faster than one cutting machine 23 of the second line 21 can cut them into several individual final smaller blank pieces 6. Thus, it is preferable to have at least two laser cutting machines 23 in the blank-fed station 21. Preferably, each laser cutting machine needs to utilize a maximized "beam-on" value adding time, i.e., the material handling must wait for the laser cutting and not the other way around. For the blank-fed station 21, the laser cutting machines 23 preferably have dual tables, i.e., one side laser cuts while the other side is being loaded/unloaded.

In addition, the coil-fed station 20 detaches peripheral blank 4 contours but, if it is laser-cutting, it can make additional cuts, preferably without detaching any offal. This enables balancing the length of cutting between coil-fed station 20 and blank-fed station 21. Cutting per each progression of the coil generally takes several seconds, typically 3 to 4 seconds, thus enabling ample time for material handling to evacuate or stack the detached peripheral blank 4 contour.

Of course, as explained above, during the cutting operations, the peripheral blank 4 or the final individual part smaller blank pieces 6 to be cut are firmly held by means of an (or several) table holding apparatus 7 equipped with a frame 8, bridge rail modules 1 and holding device modules 2 arranged on bridge rail modules 1. The table holding apparatus 7 also preferably comprises location modules 5 that are preferably pins, especially when used in the blank-fed station 21. By designing with this concept, the coil-fed station 20 preferably does not generate detached offal, and therefore is not potentially hampered or slowed down by the time needed to evacuate offal. The coil support system during cutting is then simplified for the laser machines of the coil-fed station 20.

The installation may further comprise a motion mechanism for moving a metal plate 10 to be cut along the X-axis of the table holding apparatus 7. Such kind of motion mechanism is well known to those skilled in the art. Furthermore, the installation can also comprise other well known elements used for laser cutting, including, but not limited to, one or more of the following: a laser generator for generating a laser beam, like a fiber laser generator, a laser cutting head that is used for cutting the metal plates, a gas source, such as a gas conduit and/or a gas cylinder or storage vessel, for containing and feeding an assist gas or gas mixture to the laser head that is used for assisting said laser beam during cutting, a device for moving the laser cutting head with respect to the workpiece so as to operate a cutting along the desired trajectory(ies), a control device, such as a CNC or similar, for piloting the laser head, the production cycles, and such. Of course, several peripheral blanks 4 can also be cut in the same time in the workpiece by means of several laser cutting devices 24 working in parallel.

Elements of the Figures:
1—bridge rail module
2—holding device module
3—reference locator feature
4—peripheral blank
5—location modules
6—smaller blank pieces
7—holding apparatus
8—table frame
9—grid
10—metal plate
11, 11'—successive cutting lines
12—path of cutting
20—first line or coil-fed station
21—second line or blank-fed station
22—first cutting machine
23—second cutting machine
24—laser cutting device

What is claimed:

1. A process for laser cutting a metal plate, comprising
   a) providing at least one laser cutting device,
   b) providing a metal plate to be cut from a metal coil,
   c) providing at least one holding apparatus comprising a frame and at least one bridge rail module having disposed thereon at least one holding device module to hold and maintain the metal plate stationary during cutting,
   d) cutting the metal plate by means of at least one laser beam delivered by the at least one laser cutting device
   wherein in step d):
      i) the metal plate is first cut from a metal coil by a first line comprising at least one laser cutting machine having at least one laser cutting device, into at least one peripheral blank, and
      ii) the peripheral blank is subsequently fed to at least one second line comprising at least one laser cutting machine having at least one laser cutting device, to be cut into at least one smaller individual final blank piece.

2. The process of claim 1, wherein the laser cutting in step d ii) results in the peripheral blank being cut into at least two individual smaller blank pieces.

3. The process of claim 1, wherein the laser cutting in step d ii) results in the peripheral blank being cut into at least three individual smaller blank pieces.

4. The process of claim 1, wherein the laser cutting in step d i) results in the peripheral blank being detached from the metal coil that the peripheral blank was fed from.

5. The process of claim 1, wherein during step d i) and during the cutting in the first line, the metal plate from the metal coil is held and maintained stationary by the at least one of the table holding apparatus.

6. The process of claim 5, wherein the positions of the holding device modules on the bridge rail is adjustable.

7. The process of claim 5, wherein the holding device modules are retractable/removable.

8. The process of claim 1, wherein the first line produces peripheral blanks faster than at least the one second cutting machine of the second line can cut them into at least one individual final smaller blank piece.

9. The process of claim 1, wherein during step d ii) and during the cutting in the second line, the peripheral blank is held and maintained stationary in position by the at least one holding apparatus.

10. The process of claim 1, wherein the first line produces peripheral blanks at least twice as fast as the at least one second cutting machine of the second line can cut them into several individual final smaller blank pieces.

11. The process of claim 1, wherein the table holding apparatus includes a means of providing vacuum suction or magnetic force effect.

12. The process of claim 1, wherein the table holding apparatus includes greater than one bridge rail module, each bridge rail module comprising greater than one holding device module, each holding device module having a means for suction or magnetic force effect.

13. The process of claim 1, wherein the holding apparatus comprises:
   a rigid support table frame having an X-axis and an Y-axis, and
   one or more bridge rail modules running across the Y-axis or the X-axis of the table frame, each bridge rail module comprising at least one holding device module.

14. The process of claim 13, wherein the support table frame presents the surface of the substantially flat metal plate to be cut in a non-horizontal position during cutting.

15. The process of claim 13, wherein the support table frame presents the surface of the substantially flat metal plate to be cut in a vertical position during cutting.

16. The process of claim 13, wherein the support table frame is flat.

17. The process of claim 1, wherein the table holding apparatus comprises greater than one bridge rail module, each bridge rail module comprising greater than one holding device module.

18. The process of claim 17, wherein each holding device module is in fluid connection with at least one vacuum source.

19. The process of claim 13, wherein the one or more bridge rail modules each comprise at least one reference locator feature.

20. The process of claim 19, wherein the reference locator feature houses a pin.

21. The process of claim 20, wherein the reference locator feature and/or pin are retractable.

22. The process of claim 19, wherein the reference locator feature is retractable.

23. The process of claim 13, wherein when greater than one bridge rail module is present, the bridge rail modules are parallel to one another.

24. The process of claim 1, wherein the table holding apparatus further comprises at least one motion mechanism for moving the metal plate to be cut along the X-axis of the frame.

25. The process of claim 1, wherein the at least one cutting machine of the first line and the at least one cutting machine of the second line are each independently chosen from fiber laser cutting machines, $CO_2$ laser cutting machines, disk laser cutting machines, fiber laser cutting machines and YAG laser cutting machines.

26. The process of claim 25, wherein the at least one laser cutting machine is equipped with a fiber laser.

27. The process of claim 25, wherein the at least one laser cutting machine is equipped with a $CO_2$ laser.

28. The process of claim 25, wherein the at least one laser cutting machine is equipped with a disk laser.

29. The process of claim 25, wherein the laser of the at least one laser cutting machine has an output power of at least 2 kW.

30. The process of claim 25, wherein the laser of the at least one laser cutting machine has an output power of at least 5 kW.

31. The process of claim 1, wherein the first line produces peripheral blanks at a first speed that is between 3 and 12 times greater than the second speed of the at least one second cutting machine of the second line that cut them into several individual final smaller blank pieces.

32. The process of claim 1, wherein the second line comprises greater than one second cutting machine, each second cutting machine cutting peripheral blanks into several individual final smaller blank pieces.

33. The process of claim 1, wherein in step ii), the at least one peripheral blank is stacked before being fed to the at least one second line.

* * * * *